(12) United States Patent
Mitachi et al.

(10) Patent No.: US 6,170,995 B1
(45) Date of Patent: Jan. 9, 2001

(54) FERRULE FOR OPTICAL-FIBER CONNECTOR

(75) Inventors: Seiko Mitachi; Ryo Nagase; Yoshiaki Takeuchi; Takashi Tanabe, all of Tokyo; Akihiko Sakamoto, Shiga; Hirokazu Takeuchi, Shiga; Masayuki Ninomiya, Shiga; Katsumi Inada, Shiga, all of (JP)

(73) Assignees: Nippon Telegraph and Telephone Corporation; NEC Corporation, both of Tokyo; Nippon Electric Glass Co., Ltd., Shiga, all of (JP)

( * ) Notice: Under 35 U.S.C. 154(b), the term of this patent shall be extended for 0 days.

(21) Appl. No.: 09/194,817

(22) PCT Filed: Jan. 30, 1998

(86) PCT No.: PCT/JP98/00381

§ 371 Date: Jul. 23, 1999

§ 102(e) Date: Jul. 23, 1999

(87) PCT Pub. No.: WO98/45739

PCT Pub. Date: Oct. 15, 1998

(30) Foreign Application Priority Data

Apr. 7, 1997 (JP) ........................................ 9-88356

(51) Int. Cl.[7] ................................................. G02B 6/36
(52) U.S. Cl. ............................ 385/78; 385/76; 385/141; 385/77
(58) Field of Search ................................ 385/76, 77, 78, 385/141, 147, 60

(56) References Cited

U.S. PATENT DOCUMENTS

| | | | | |
|---|---|---|---|---|
| 5,295,213 | * | 3/1994 | Ueda et al. | 385/78 |
| 5,631,986 | * | 5/1997 | Frey et al. | 385/78 |
| 5,926,595 | * | 7/1999 | Matsui et al. | 385/78 |

FOREIGN PATENT DOCUMENTS

| | | | | |
|---|---|---|---|---|
| 63-500684 | * | 3/1988 | (JP) | 385/78 X |
| 5-72441 | * | 3/1993 | (JP) | 385/78 X |
| 8-171030 | * | 7/1996 | (JP) | 385/78 X |
| WO98/45739 | * | 10/1998 | (WO) | 385/78 X |

* cited by examiner

*Primary Examiner*—Brian Healy
(74) *Attorney, Agent, or Firm*—Laff, Whitesel & Saret, Ltd.; J. Warren Whitesel

(57) ABSTRACT

In order to provide a ferrule for an optical-fiber connector used for good organization of an optical communication network, the ferrule for an optical-fiber connector is made of a crystallized glass having a composition which consists essentially of, by weight percent, 60–70% of $SiO_2$, 16–25% of $Al_2O_3$, 1.5–3% of $Li_2O$, 0.5–2.5% of MgO, 1.3–4.5% of $TiO_2$, 0.5–3% of $ZrO_2$, 2–6.5% of $TiO_2+ZrO_2$, 1–5.5% of $K_2O$, 0–7% of ZnO, and 0–3% of BaO. The crystallized glass includes 30–70 volume % precipitation of β-spodumene solid solution or β-quartz solid solution having an average grain size not greater than 2 μm. In addition, the crystallized glass has a bend strength of 200 MPa or more and a thermal expansion coefficient of $-10{\sim}50{\times}10^{-7}/°$C. at a temperature between −50 and 150° C.

2 Claims, 2 Drawing Sheets

FERRULE FOR OPTICAL-FIBER CONNECTOR

TECHNICAL FIELD

This invention relates to an optical-fiber connector ferrule for use in an optical-fiber connector for connecting an optical fiber.

BACKGROUND ART

A ferrule used in optical communication is an important component of an optical-fiber connector. The ferrule is a cylindrical component having a through hole for insertion of an optical fiber made of silica glass. Connection of optical fibers is carried out by inserting and fixing optical fibers in the through holes of ferrules, respectively, polishing their ends, and thereafter, inserting the ferrules in an outer tube called a sleeve to face-to-face contact with each other. Therefore, the ferrule must have an excellent dimensional accuracy and is further required to have various material properties such as high mechanical strength, high abrasion resistance against friction upon insertion and removal into and out of the sleeve, polishability which is close to that of silica glass so that a polished amount of the ferrule does not greatly differ from that of the optical fiber during polishing the end, and a thermal expansion coefficient close to that of silica glass. In order to organize an optical communication network well, it is an urgent demand to provide a ferrule which satisfies the above-mentioned material properties and which can be manufactured at a low cost.

At present, there have been used ferrules made of ceramics such as zirconia and alumina and of amorphous glass. Among them, the ferrule made of ceramics is excellent in mechanical strength and abrasion resistance but has the following disadvantages. Specifically, it is considerably low in a rate to be polished as compared with the fiber of silica, so that it is necessary to use a special polishing method. It is so high in thermal expansion coefficient as compared with the optical fiber that an initial connection loss is readily deteriorated by the changes in dimension of both of them following a temperature variation. Furthermore, it is so low in formability and machinability to degrade the production efficiency, resulting in a high cost.

On the other hand, the ferrule made of amorphous glass is advantageous in that the polished rate is very close to that of the silica fiber to require no special polishing method, resulting in a reduced polishing cost, and that the formability and the machinability are excellent to enable the production at a low cost. However, it is disadvantageous in that the mechanical strength and the abrasion resistance are insufficient.

In addition, a proposal is made of a ferrule of crystallized glass. For example, JP-B S63-500684 discloses an art in which the crystallized glass of $Li_2O$—$Al_2O_3$—$SiO_2$ is used as a ferrule material. In the art, it is possible to obtain the ferrule which has the thermal expansion coefficient close to that of the silica fiber, but there is neither consideration about the abrasion resistance, the polishability, and the machinability, nor knowledge is given about those properties. Furthermore, JP-A H1-288803 discloses a connection component made of the crystallized glass of $P_2O_5$—CaO. In the art, it is possible to obtain the ferrule which is excellent in machinability, but there is no consideration about the abrasion resistance and the mechanical strength. In addition, it has cost-rising factors such as the use of a laser to form the through hole, and others.

As described above, there is no such ferrule in the present status that satisfies all of the requirements for use in the optical-fiber connector.

In the meanwhile, the crystallized glass is generally higher in strength than the amorphous glass because of an energy absorption effect given by bending and branching of cracks at the interface between precipitated crystals and a glass matrix. Further, crystallization makes it possible to obtain a material improved in abrasion resistance and low in thermal expansion coefficient. In addition, the crystallized glass advantageously has a formability suitable for mass production, like the amorphous glass.

Accordingly, the use of the crystallized glass has a possibility of providing a ferrule at a low manufacturing cost but with excellent characteristics unexpected in conventional ferrule materials.

However, the above-mentioned excellent features of the crystallized glass widely vary depending upon the kind, the size, and the amount of the precipitated crystals. In an unsuitably crystallized state, the characteristics necessary to the ferrule can not be realized.

In view of the above, it is an object of this invention to provide a ferrule for an optical-fiber connector, which is excellent in mechanical strength and abrasion resistance.

It is another object of this invention to provide a ferrule for an optical-fiber connector, which has a thermal expansion coefficient and a polishability close to those of an optical fiber.

It is still another object of this invention to provide a ferrule for an optical-fiber connector, which has a dimensional accuracy equivalent to that of a zirconia ferrule used for connecting a single mode optical fiber.

It is a further object of this invention to provide a ferrule for an optical-fiber connector, which can be manufactured at a low cost as compared with a zirconia ferrule.

DISCLOSURE OF THE INVENTION

As a result of a various kinds of studies, the present inventors found out that the use of crystallized glass having a specific composition and a specific feature enables to provide a ferrule which satisfies all of required material properties and which can be manufactured at a low cost.

Specifically, a ferrule for an optical-fiber connector of this invention is characterized by comprising crystallized glass having a composition which consists essentially of, by weight percent, 60–70% of $SiO_2$, 16–25% of $Al_2O_3$, 1.5–3% of $Li_2O$, 0.5–2.5% of MgO, 1.3–4.5% of $TiO_2$, 0.5–3% of $ZrO_2$, 2–6.5% of $TiO_2+ZrO_2$, 1–5.5% of $K_2O$, 0–7% of ZnO, and 0–3% of BaO, precipitating 30–70 volume % of β-spodumene solid solution or β-quartz solid solution having an average grain size not greater than 2 μm, and having a bend strength of 200 MPa or more and a thermal expansion coefficient of $-10\sim50\times10^{-7}/°$ C. at a temperature between −50 and 150° C.

BEST MODE OF EMBODYING THE INVENTION

Figure 1:
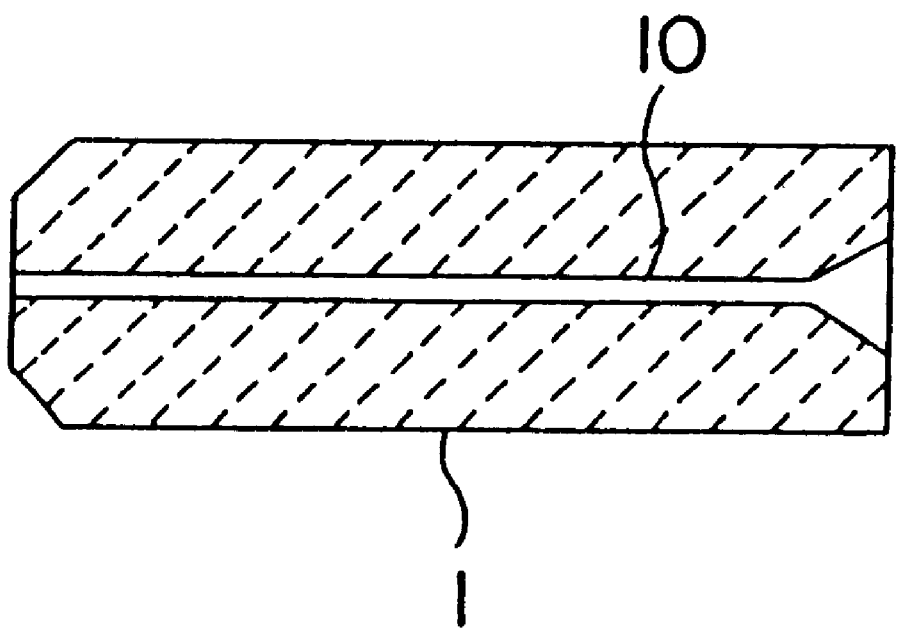
FIG. 1 is a sectional view showing a ferrule according to an embodiment of this invention.

Before describing an embodiment of this invention, description will be made about a reason why a ferrule material of this invention is restricted as described above.

In the ferrule of this invention, the amount of precipitated crystals of the crystallized glass used is between 30 and 70 volume %, preferably between 35 and 60 volume %. The amount of the precipitated crystals affects a thermal expansion coefficient and mechanical strength and, in particular, remarkably affects abrasion resistance, polishability, and formability of the glass. Specifically, if the amount of precipitated crystals is less than 30 volume %, the abrasion resistance becomes insufficient. The ferrule may be damaged in repetition of insertion and removal into and out of a zirconia sleeve and, thereby can not maintain its initial connection characteristic. On the other hand, if the amount of precipitated crystals is 30 volume % or more, the abrasion resistance is remarkably improved so that no damage occurs even after the insertion and removal are repeated several hundreds times. However, if an excessively large amount of the crystals are precipitated, the polishability and the formability are impaired. Specifically, if the crystals more than 70 volume % are precipitated, a polished rate is low as compared with silica glass. In this event, a special polishing method is required to reduce the difference in polished rate between them. This results in a high cost. Furthermore, the glass having such a strong crystallinity is liable to cause devitrification during formation. Thus, high-efficiency production can not be achieved.

An optical fiber made of silica glass has a thermal expansion coefficient of $5.5 \times 10^{-7}/°$ C. (in a range between $-50$ and $150°$ C.), which is remarkably small as compared with ceramics or amorphous glass generally used. If it is used together with the conventional ferrule, the both are changed in dimensions following the temperature variation so that the initial connection characteristic is readily deteriorated. On the other hand, β-spodumene solid solution or β-quartz solid solution has an extremely low thermal expansion coefficient.

Consequently, the ferrule of this invention made of the crystallized glass containing the above-mentioned crystals as main crystals has a low thermal expansion coefficient so as to overcome or alleviate the above-mentioned problems.

The thermal expansion coefficient changes depending upon the amount of the precipitated crystals and falls within the range of $-10 \sim 10^{-7}/°$ C. (in a range between $-50$ and $150°$ C.) for the crystal amount between 30 and 70 volume %. The above-mentioned range is a usable one for the ferrule, but it is preferable to adjust the thermal expansion coefficient into a specific range of $-5 \sim 35 \times 10^{-7}/°$ C.

In this invention, the precipitated crystals of the crystallized glass have an average grain size not greater than 2 $\mu$m, preferably not greater than 1 $\mu$m. If the average grain size is not greater than 2 $\mu$m, the crystallized glass has a bend strength of 200 MPa or more and a sufficient abrasion resistance required as the ferrule.

As regards the mechanical strength of the ferrule, it is calculated that the ferrule must have a bend strength not smaller than 200 MPa, preferably not smaller than 250 MPa, in order to assure the transverse rupture strength of 5 Kg which is the standard value of the tensile strength of a coaxial connector as prescribed by JIS C5415. If the average grain size of the crystals is not greater than 2 $\mu$m, sufficiently high mechanical strength can be obtained to satisfy the above-mentioned requirement. However, if the average grain size is excessively large, a thermal stress is increased at the interface between the crystals and a glass matrix due to the difference in thermal expansion coefficient. As a result, microcracks are caused to occur so that the mechanical strength is reduced. In addition, if the average grain size is excessively large, the abrasion resistance is deteriorated.

Next, description will be made about the reason why the composition of the crystallized glass used in the ferrule of this invention is restricted as mentioned above.

$SiO_2$ is a main component of the glass and also a crystal component. The content thereof is between 60 and 70%, preferably between 62.3 and 67.5%. If $SiO_2$ is less than 60%, the crystals become coarse. If it is more than 70%, the viscosity of a melt in a glass melting process becomes high, so that the glass produced becomes unhomogeneous.

$Al_2O_3$ is also a component which forms the crystals. The content thereof is between 16 and 25%, preferably between 17 and 22%. If $Al_2O_3$ is beyond the above-mentioned range, the precipitated crystals become coarse. In addition, if it is more than 25%, the devitrification is readily caused to occur in the glass melting step.

$Li_2O$ is also a crystal-forming component. The content thereof is between 1.5 and 3%, preferably between 2 and 2.8%. If the content of $Li_2O$ is less than 1.5%, precipitation of the desired crystals is difficult so that the abrasion resistance is remarkably reduced and the mechanical strength and the thermal expansion characteristic are deteriorated. If it is more than 3%, the amount of the precipitated crystals exceeds 70 volume %. As a consequence, the polishability is deteriorated and the crystals become coarse.

MgO is a component which promotes melting of the glass and which forms the crystals. The content thereof is between 0.5 and 2.5%, preferably between 0.5 and 2%. If the content of MgO is less than 0.5%, heterogeneous crystals are precipitated so that the amount of the main crystals tends to be reduced. If it is more than 2.5%, the amount of the precipitated crystals is excessive and the crystals become coarse.

$TiO_2$ is an essential component which acts as a nucleating agent when the glass is crystallized. The content thereof is between 1.3 and 4.5%, preferably between 1.5 and 3.8%. If the content of $TiO_2$ is less than 1.3%, the crystallized glass having a uniform structure can not be obtained. If it is more than 4.5%, the devitrification is caused to occur in the glass melting step.

$ZrO_2$ is also a component which acts as a nucleating agent, like $TiO_2$. The content thereof is between 0.5 and 3%, preferably between 0.5 and 2.5%. If the content of $ZrO_2$ is less than 0.5%, it is difficult to obtain the crystals having a desired size. If it exceeds 3%, the glass melt is readily devitrified and the precipitated crystals become coarse.

Furthermore, the total amount of $TiO_2$ and $ZrO_2$ must fall within a range between 2 and 6.5%, preferably between 2.5 and 6%. If the total amount of those components is less than 2%, nucleation is insufficient so that the heterogeneous crystals are readily precipitated and the crystals become coarse. If it is more than 6.5%, the glass melt is remarkably readily devitrified.

$K_2O$ is used in order to suppress the precipitation of the heterogeneous crystals and to control the amount of the main crystals. The content thereof is between 1 and 5.5%, preferably between 1.5 and 4.8%. If the content of $K_2O$ is less than 1%, the heterogeneous crystals are precipitated so that the desired characteristic is not obtained. Further, the crystal amount is increased so that the polishability is deteriorated. On the other hand, if it is more than 5.5%, the crystal amount is reduced so that the abrasion resistance is remarkably degraded.

ZnO is a component which promotes melting of the glass and which improves the uniformity. The content thereof is between 0 and 7%, preferably between 1 and 5%. If the content of ZnO is more than 7%, the heterogeneous crystals are precipitated so that the thermal expansion coefficient is excessively large.

BaO is also a component which promotes melting of glass and which improves the uniformity, like ZnO. The content thereof is between 0 and 3%, preferably between 0.5 and 2.5%. If the content of BaO is more than 3%, the heterogeneous crystals are readily precipitated.

Besides the above-mentioned components, a component or components selected from SrO, CaO, $Na_2O$, $Bi_2O_3$, $B_2O_3$, and PbO may be added up to 10% in total for the purpose of facilitating melting of the glass and adjusting the thermal expansion coefficient of the resultant crystallized glass, and $P_2O_5$ may be added up to 5% in order to adjust the crystal amount and the crystal grain size. In addition, it is possible to add $As_2O_3$, $Sb_2O_3$, and $SnO_2$ up to 2.5%, preferably up to 1.5%, respectively, as a refining agent upon melting the glass.

In this invention, it is possible to greatly improve the bend strength by forming a compressive stress layer on the surface of the ferrule.

For example, the compressive stress layer can be formed in the following manner.

(1) Li ions in a surface layer is substituted by ions having a greater ionic radius (ion exchange).

(2) Rapid cooling is carried out from a temperature not lower than the strain point of the crystallized glass to another temperature not higher than the strain point.

(3) After adjusting the kind and the amount of the precipitated crystals so as to lower the thermal expansion coefficient of the ferrule at the surface than that in the interior, cooling is carried out.

Now, description will be made about specific examples of this invention.

Table 1 to Table 3 show the examples of this invention (Samples Nos. 1–8) and comparative examples (Samples Nos. 9–13).

Each of Samples Nos. 1–11 was prepared in the following manner. First, glass materials appropriately selected so as to obtain the composition shown in the table were mixed, and then melted at 1650° C. for 24 hours. The resultant molten glass was then poured into a carbon mold having a diameter of 60 mm and a depth of 1 m. Thereafter, slow cooling was carried out. After the resultant glass was crystallized at a temperature up to 1100° C. as a highest temperature, a crystallized glass preform having a through hole was prepared. Then, after grinding the surface of the crystallized glass preform thus obtained to adjust a circularity, hot drawing was carried out to thereby obtain a ferrule 1 for an optical-fiber connector having a through hole 10 and having a diameter of 2.5 mm and a length of 10.5 mm was obtained as illustrated in FIG. 1. In addition, for Samples Nos. 3, 4, 8, and 11, ion exchange was carried out for their surfaces. Samples Nos. 2, 6, and 7 were subjected to rapid cooling to form the compressive stress layers. It is noted here that the ion exchange was carried out by immersing the samples in a fused salt of $KNO_3$ kept at 400° C. and retaining for 10 hours to substitute Li ions in the crystallized glass by K ions. The rapid cooling was carried out by cooling the ferrule from 1000° C. to 100° C. at the rate of 300° C./minute.

As Samples Nos. 12 and 13, use was made of a zirconia ferrule and an amorphous glass ferrule which are currently used, respectively.

For each of the samples obtained as mentioned above, evalution was made of the precipitated crystals, the average grain size of the crystals, the crystal amount, the bend strength, the thermal expansion coefficient, the abrasion resistance, and the polishability. Except the abrasion resistance, the evaluation was carried out after the ferrule material was shaped into a configuration suitable for measurement. The result is shown in Tables.

As is obvious from the following tables, all of Samples Nos. 1 to 8 as the examples of this invention have the bend strength as high as 200 MPa or more and the abrasion resistance against the insertion and the removal of several hundred times. Thus, the performance is remarkably improved as compared with the conventional amorphous glass ferrule (Sample No. 13).

TABLE 1

| | Sample No. | 1 | 2 | 3 | 4 | 5 |
|---|---|---|---|---|---|---|
| Glass Composition (Weight %) | $SiO_2$ | 62.3 | 64.0 | 65.5 | 67.5 | 61.8 |
| | $Al_2O_3$ | 21.2 | 18.3 | 18.2 | 17.3 | 22.0 |
| | $Li_2O$ | 2.8 | 2.3 | 2.3 | 2.3 | 2.0 |
| | MgO | 1.0 | 1.0 | 1.0 | 0.7 | 1.8 |
| | $TiO_2$ | 1.8 | 1.8 | 3.0 | 3.1 | 3.8 |
| | $ZrO_2$ | 1.8 | 1.8 | 1.8 | 1.0 | 0.5 |
| | $K_2O$ | 1.5 | 3.4 | 3.4 | 3.4 | 2.3 |
| | ZnO | 5.0 | 3.1 | 3.1 | 1.3 | 1.0 |
| | BaO | 1.6 | 2.5 | 1.0 | 0.5 | 0.5 |
| | SrO | — | — | — | 1.5 | — |
| | CaO | 0.6 | 1.0 | — | — | — |
| | $P_2O_5$ | — | — | — | 0.1 | — |
| | $Na_2O$ | — | — | — | 0.5 | — |
| | $Bi_2O_3$ | — | — | — | — | 1.5 |
| | $B_2O_3$ | — | — | — | — | 0.5 |
| | PbO | — | — | — | — | 1.5 |
| | $As_2O_3$ | 0.4 | 0.8 | 0.7 | — | — |
| | $Sb_2O_3$ | — | — | — | 0.8 | — |
| | $SnO_2$ | — | — | — | — | 0.8 |
| Presence or Absence of Compressive Stress Layer | | Absent | Present | Present | Present | Absent |
| Kind of Precipitated Crystals | | S | S | S | Q | Q |
| Average Grain Size of Crystals (μm) | | 2.0 | 1.5 | 0.5 | 0.2 | 0.3 |
| Crystal Amount (Volume %) | | 65 | 55 | 40 | 50 | 50 |
| Bend Strength (MPa) | | 300 | 500 | 550 | 500 | 280 |
| Thermal Expansion Coefficient ($\times 10^{-7}$/° C.) | | 20 | 22 | 30 | 10 | 15 |
| Abrasion Resistance (Number of Times) | | >500 | 350 | >500 | 400 | 300 |
| Polished Amount Difference (μm) | | 5 | 4 | 2 | 2 | 2 |

TABLE 2

| | Sample No. | 6 | 7 | 8 | 9 | 10 |
|---|---|---|---|---|---|---|
| Glass Composition (Weight %) | $SiO_2$ | 66.4 | 64.2 | 65.3 | 71.0 | 60.0 |
| | $Al_2O_3$ | 19.2 | 18.2 | 18.2 | 13.0 | 25.0 |
| | $Li_2O$ | 2.3 | 2.5 | 2.4 | 4.5 | 4.2 |
| | MgO | 0.5 | 0.5 | 0.8 | 0.5 | 0.5 |
| | $TiO_2$ | 3.0 | 3.4 | 3.2 | 2.0 | 3.9 |
| | $ZrO_2$ | 1.8 | 2.0 | 1.8 | 1.8 | 1.0 |
| | $K_2O$ | 1.5 | 3.0 | 3.0 | 2.0 | — |
| | ZnO | 1.1 | 3.6 | 3.2 | 2.0 | — |
| | BaO | 1.0 | 1.3 | 1.3 | 1.9 | 2.0 |
| | SrO | — | — | — | — | 1.0 |
| | CaO | 0.5 | — | — | — | 1.0 |
| | $P_2O_5$ | 1.5 | — | — | — | — |
| | $Na_2O$ | — | — | — | — | — |
| | $Bi_2O_3$ | — | 0.5 | 0.2 | — | — |
| | $B_2O_3$ | — | — | — | — | — |
| | PbO | — | — | — | — | — |
| | $As_2O_3$ | 1.2 | 0.8 | — | 1.3 | 1.4 |

TABLE 2-continued

| | Sample No. | 6 | 7 | 8 | 9 | 10 |
|---|---|---|---|---|---|---|
| | $Sb_2O_3$ | — | — | — | — | — |
| | $SnO_2$ | — | — | 0.6 | — | — |
| Presence or Absence of Compressive Stress Layer | | Present | Present | Present | Absent | Absent |
| Kind of Precipitated Crystals | | Q | S | S | Q | S |
| Average Grain Size of Crystals (μm) | | 1.2 | 0.5 | 0.5 | 3.0 | 7.0 |
| Crystal Amount (Volume %) | | 65 | 60 | 58 | 60 | 90 |
| Bend Strength (MPa) | | 480 | 620 | 600 | 150 | 180 |
| Thermal Expansion Coefficient (×10⁻⁷/° C.) | | 5 | 22 | 24 | 28 | 12 |
| Abrasion Resistance (Number of Times) | | >500 | >500 | >500 | 60 | 80 |
| Polished Amount Difference (μm) | | 4 | 4 | 4 | 4 | 30 |

TABLE 3

| | Sample No. | 11 | 12 | 13 |
|---|---|---|---|---|
| Glass Composition (Weight %) | $SiO_2$ | 64.5 | — | 72.5 |
| | $Al_2O_3$ | 20.0 | — | 6.5 |
| | $Li_2O$ | 2.5 | — | — |
| | MgO | 0.5 | — | — |
| | $TiO_2$ | 1.2 | — | — |
| | $ZrO_2$ | — | 97 | — |
| | $K_2O$ | 6.0 | — | 1.8 |
| | ZnO | — | — | — |
| | BaO | — | — | 1.2 |
| | SrO | — | — | — |
| | CaO | — | — | 0.7 |
| | $P_2O_5$ | 2.8 | — | — |
| | $Na_2O$ | — | — | 5.9 |
| | $Bi_2O_3$ | — | — | — |
| | $B_2O_3$ | — | — | 11.3 |
| | PbO | — | — | — |
| | $As_2O_3$ | 1.0 | — | — |
| | $Sb_2O_3$ | — | — | 0.1 |
| | $SnO_2$ | 1.5 | — | — |
| | $Y_2O_3$ | — | 3 | — |
| Presence or Absence of Compressive Stress Layer | | Present | Absent | Absent |
| Kind of Precipitated Crystals | | S | $ZrO_2$ | — |
| Average Grain Size of Crystals (μm) | | 1.5 | 0.5 | — |
| Crystal Amount (Volume %) | | 20 | 100 | — |
| Bend Strength (MPa) | | 350 | 1350 | 120 |
| Thermal Expansion Coefficient (×10⁻⁷/° C.) | | 55 | 83 | 60 |
| Abrasion Resistance (Number of Times) | | 15 | >500 | 10 |
| Polished Amount Difference (μm) | | 2 | 50 | −2 |

In addition, as is obvious from the foregoing tables, the thermal expansion coefficient as well as the polished amount difference from the silica glass are remarkably improved as compared with the zirconia ferrule (Sample No. 12).

On the other hand, in Sample No. 9 as the comparative example, the crystals are coarse. Therefore, the bend strength and the abrasion resistance are reduced. In No. 10, the precipitated crystals become coarse so that the bend strength and the abrasion resistance are degraded. Further, since the crystal amount is excessive, the polishability is deteriorated. Sample No. 11 keeps the high bend strength by the effect of the ion exchange but is much inferior in abrasion resistance because the crystal amount is too small.

Identification of the main crystals and quantitative analysis of the crystals were carried out by an X ray powder diffraction (in the tables, S and Q represent the β-spodumene solid solution and the β-quartz solid solution, respectively). The average grain size of the crystals was calculated from the values measured by a scanning electron microscope. The bend strength was measured by a three-point bending method using a shaped material having a diameter of 2.5 mm and a length of 36 mm. The thermal expansion coefficient was obtained as an average value in a range between −50 to 150° C. from a thermal expansion curve measured by a dilatometer. As to the abrasion resistance, each sample was repeatedly inserted and removed into and out of the zirconia sleeve, based on JIS C5961, to obtain the number of times of repetition of insertion and removal before the occurrence of a damage. The judgement of the damage was carried out by a probe-type shape detector. The evaluation of the polishability was carried out in the following manner. Specifically, with cerium oxide used as an abrasive, a polishing pad made of felt was rotated at a peripheral speed of 50 m/min. The material shaped into a size of 20×20×2 mm was polished for 30 minutes under a pressure of 500 g/cm². Then, the variation in the thickness was measured. In addition, the variation in thickness was measured for silica glass polished in the same condition. Subsequently, the difference between those variations in thickness was obtained as a measure. Specifically, the smaller the difference is, the polishability is closer to that of silica glass.

Next, Sample No. 3 was attached to the optical fiber to form the optical connector. Then, evaluation of the optical characteristics was carried out. As the optical fiber, use was made of a single mode fiber cord having a mode field diameter of 9.5 μm. As the optical connector, an SC-type optical connector defined in JIS C5973 was used.

First, the ferrule of Sample No. 3 according to this invention was bonded to the above-mentioned optical fiber with an epoxy adhesive (epo-tek353ND). An end face thereof was polished by advanced PC. The end face of the ferrule after polished had a surface roughness, a convex spherical shape, and a fiber lead-in amount equivalent to those of the typical zirconia ferrule.

Figure 2:
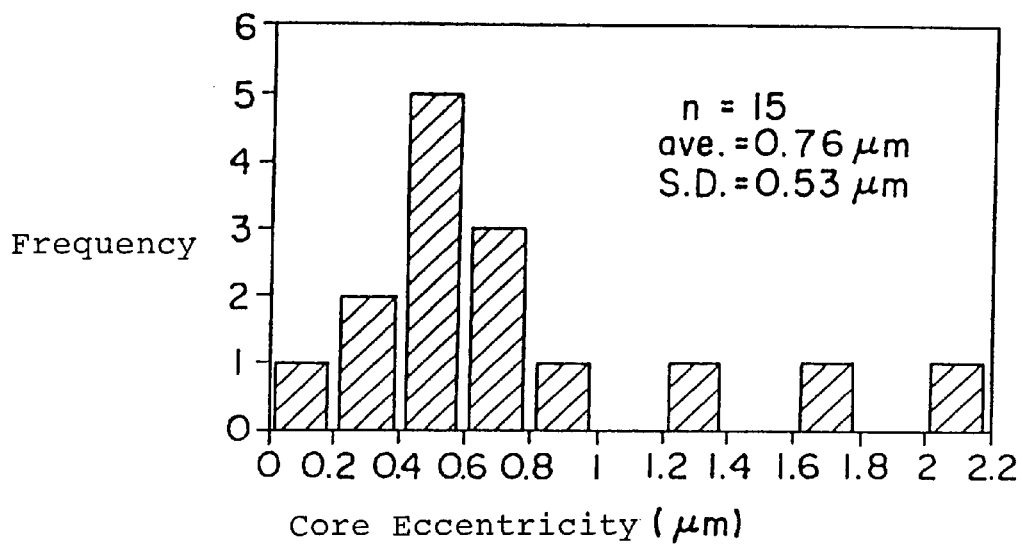
FIG. 2 is a graph showing a distribution of an eccentricity of an optical fiber core with respect to an outer diameter of the ferrule of FIG. 1.

For each of the fifteen ferrules after polished, measurement was made about the eccentricity of the fiber core relative to the ferrule outer diameter. The result is shown in FIG. 2. As is obvious from FIG. 2, the eccentricity of the fiber core relative to the ferrule outer diameter averages 0.76 μm. Thus, the distribution was comparable to the case where the typical zirconia ferrule was used.

Figure 3:
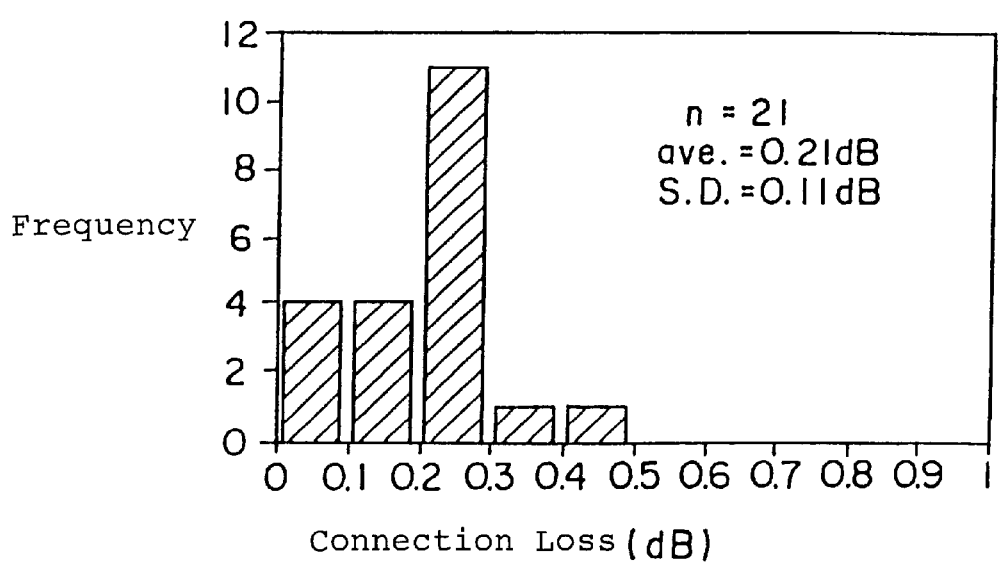
FIG. 3 is a graph showing a distribution of a connection loss when the ferrule of FIG. 1 is used.

Next, two optical connector plugs were assembled and connected, and a connection loss was measured by the use of a laser-diode light source of a wavelength of 1.31 μm. An optical cord used herein had a length of 2 m. The SC-type optical connector using the typical zirconia ferrule was attached to the other end opposite to the one end to which the sample was attached. Then, measurement of the optical characteristics was performed. FIG. 3 shows the result of measurement with respect to twenty-one combinations. As is obvious from FIG. 3, the average connection loss was 0.21 dB and, in the worst case, 0.5 dB or less. In addition, the return loss was not smaller than 50 dB with respect to all combinations. These values represent the characteristics sufficient to a practical use in the optical communication network which requires a high performance. In the foregoing, description has been made as regards the application to the SC connector. As will readily be understood, the range of application of this invention is not restricted to this embodiment and this invention is also applicable to ferrules of optical connectors other than the SC connector.

As described above, the ferrule of this invention is excellent in mechanical strength and abrasion resistance and has the thermal expansion coefficient and the polishability close to those of the silica fiber. Moreover, the dimensional accuracy is equivalent to that of the zirconia ferrule used for connecting the single mode optical fiber.

In addition, manufacture at a low cost is possible as compared with the zirconia ferrule. Accordingly, the ferrule is suitable for use in the optical fiber connector and contributes to the organization of the optical communication network.

INDUSTRIAL APPLICABILITY

As described above, the ferrule for the optical-fiber connector according to this invention is suitable for use in the optical connector such as the SC connector or those other than the SC connector, used in good organization of the optical communication network.

We claim:

1. A ferrule for an optical-fiber connector, which is made of a crystallized glass having a composition which consists essentially of, by weight percent, 60–70% of $SiO_2$, 16–25% of $Al_2O_3$, 1.5–3% of $Li_2O$, 0.5–2.5% of MgO, 1.3–4.5% of $TiO_2$, 0.5–3% of $ZrO_2$, 2–6.5% of $TiO_2+ZrO_2$, 1–5.5% of $K_2O$, 0–7% of ZnO, and 0–3% of BaO, including 30–70 volume % precipitation of β-spodumene solid solution or β-quartz solid solution having an average grain size not greater than 2 $\mu$m, having a bend strength of 200 MPa or more, and having a thermal expansion coefficient of $-10 \sim 50 \times 10^{-7}/°$ C. at a temperature between −50 and 150° C.

2. A ferrule for an optical fiber connector as claimed in claim 1, wherein a compression stress layer is formed in an outer surface layer thereof.

* * * * *